Figure 1:
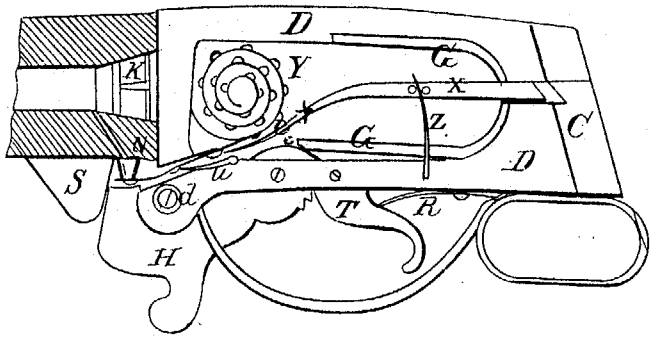

F. D. NEWBURY.

Breech-Loading Fire-Arm.

No. 171 A. I. Patented July 14, 1857

Witnesses

Thos. Parker Jr. W.M.

John Green Jr.

Signed

F. D. Newbury

N. PETERS, PHOTO-LITHOGRAPHER, WASHINGTON, D. C.

UNITED STATES PATENT OFFICE.

FREDERICK D. NEWBURY, OF ALBANY, NEW YORK.

IMPROVEMENT IN BREECH-LOADING FIRE-ARMS.

Specification forming part of Letters Patent No. 15,521, dated August 12, 1856; Additional Improvement No. 171, dated July 14, 1857.

*To all whom it may concern:*

Be it known that I, FREDERICK D. NEWBURY, of the city of Albany, State of New York, have invented certain Improvements upon the Method of Constructing Breech-Loading Fire-Arms, for which Letters Patent of the United States were granted to Richard Varrick DeWitt, Jr., as my assignee, on the 12th day of August, 1856, together with the improvements annexed thereto by the Letters Patent issued to him September 16, 1856, and March 31, 1857; and I declare the following specification, with the drawings hereto annexed as part of the same, to be a full and perfect description of my invention.

My improvement is in the automatic priming apparatus, and is numbered Figure 12, lettered to correspond with the other figures in the patents.

D denotes the arm which carries the breech-closer K, hammer H, and trigger T, and which lies within the metal framing C C, (shown in Figs. 1 and 2,) rear bar shown in Fig. 12. The priming (Maynard's or other tape priming) Y lies coiled within the arm D, its lower end passing out through a slot cut in the lower angle of the arm, just above the hinge *d*, and in range with cone N, and is placed with one of its detonating pellets over the cone. A small pawl-spring, *u*, lies against one of the pellets and prevents the retraction of the tape-primer. The tape is operated by the ratchet-spring *e*, forming part of or attached to a rod, *x*, which passes horizontally out through the rear end of D, so as to touch the rear bar of the frame C within which the arm lies. When the breech is closed, the rod *x* will lie as shown in the figure; but when the arm is lowered for the purpose of loading the gun it is thrown out a short (regulated) distance by the small spring *z*, as shown by the light lines in C. This carries the spring *e* behind one of the pellets, so that when the arm is brought up within the frame it pushes the primer forward and brings the end pellet over the cone. This operation taking place after the piece has been cocked by the movement of the arm, the piece is ready for firing the moment that the arm D is home in its chamber.

What I claim is—

The placing of the tape-priming within the chamber of the arm D and operating the priming by the movement of the arm through and in combination with the ratchet-rod and spring *x* and pawl-spring *u*, or their equivalents, substantially as set forth in this specification.

F. D. NEWBURY.

Witnesses:
RICHD. VARRICK DEWITT,
JOHN OGDEN DEY.